(12) United States Patent
Enomoto et al.

(10) Patent No.: US 7,466,359 B2
(45) Date of Patent: Dec. 16, 2008

(54) IMAGE-PICKUP APPARATUS AND METHOD HAVING DISTANCE MEASURING FUNCTION

(75) Inventors: Kazuhito Enomoto, Kodaira (JP); Nobuaki Fujimura, Kokubunji (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 660 days.

(21) Appl. No.: 11/087,506

(22) Filed: Mar. 24, 2005

(65) Prior Publication Data

US 2005/0220450 A1    Oct. 6, 2005

(30) Foreign Application Priority Data

Apr. 5, 2004    (JP)    ............... 2004-110981

(51) Int. Cl.
*H04N 5/222*    (2006.01)
(52) U.S. Cl. ............... 348/370; 396/104; 348/312; 348/348; 348/364
(58) Field of Classification Search ............... 348/370, 348/211.9, 227.1
See application file for complete search history.

(56) References Cited

U.S. PATENT DOCUMENTS

| 6,801,639 B2 * | 10/2004 | Nonaka et al. ............... 382/106 |
| 6,937,270 B1 * | 8/2005 | Dong et al. ............... 348/159 |
| 2001/0004271 A1 * | 6/2001 | Konishi ............... 348/371 |
| 2002/0067423 A1 * | 6/2002 | Suzuki ............... 348/370 |
| 2003/0026474 A1 * | 2/2003 | Yano ............... 382/154 |
| 2003/0076312 A1 * | 4/2003 | Yokoyama ............... 345/204 |

FOREIGN PATENT DOCUMENTS

| CN | 1275811 | 12/2000 |
| JP | 9-230230 | 9/1997 |
| JP | 2000-055632 | 2/2000 |
| JP | 200055632 | 2/2000 |
| JP | 2000253393 | 9/2000 |
| JP | 2003-346188 | 12/2003 |

* cited by examiner

*Primary Examiner*—Ngoc-Yen T Vu
*Assistant Examiner*—Joel Fosselman
(74) *Attorney, Agent, or Firm*—Mattingly, Stanger, Malur & Brundidge, P.C.

(57) ABSTRACT

An image-pickup apparatus for capturing an object includes a distance calculating unit for measuring a phase difference (time difference) from the emission of light from a light emitting unit to the reception of reflected light by a light receiving unit for each unit composed of a predetermined number of adjacent pixels of the object to calculate a distance from the image-pickup apparatus to each corresponding pixel unit of the object, and an image processing unit for corresponding the distance calculated in units of the predetermined number of pixels to the image captured by the light receiving unit. The image processing unit supplies a display unit with only pixels corresponding to a predetermined range in the image generated by the distance calculating unit to display the pixels in units of the predetermined number of pixels on the display unit.

4 Claims, 12 Drawing Sheets

PRIOR ART FIG. 1
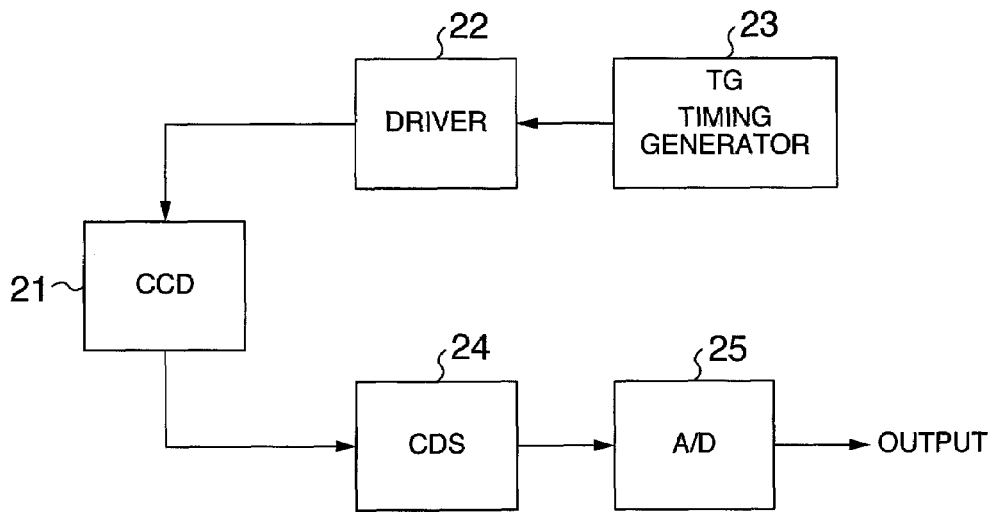
FIG. 5
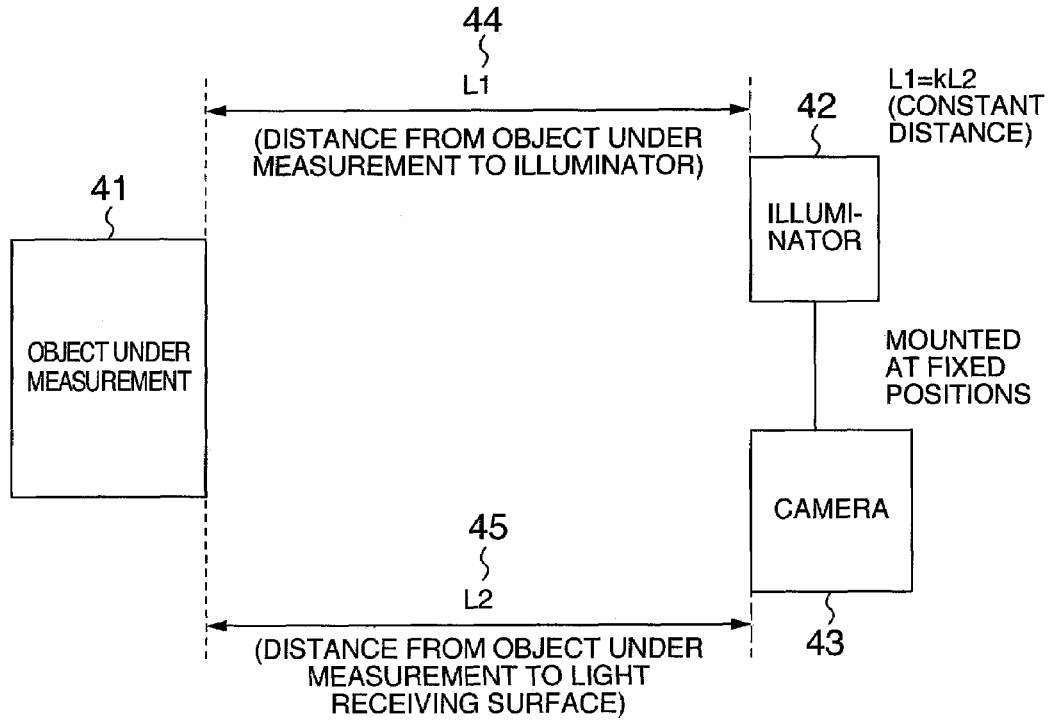

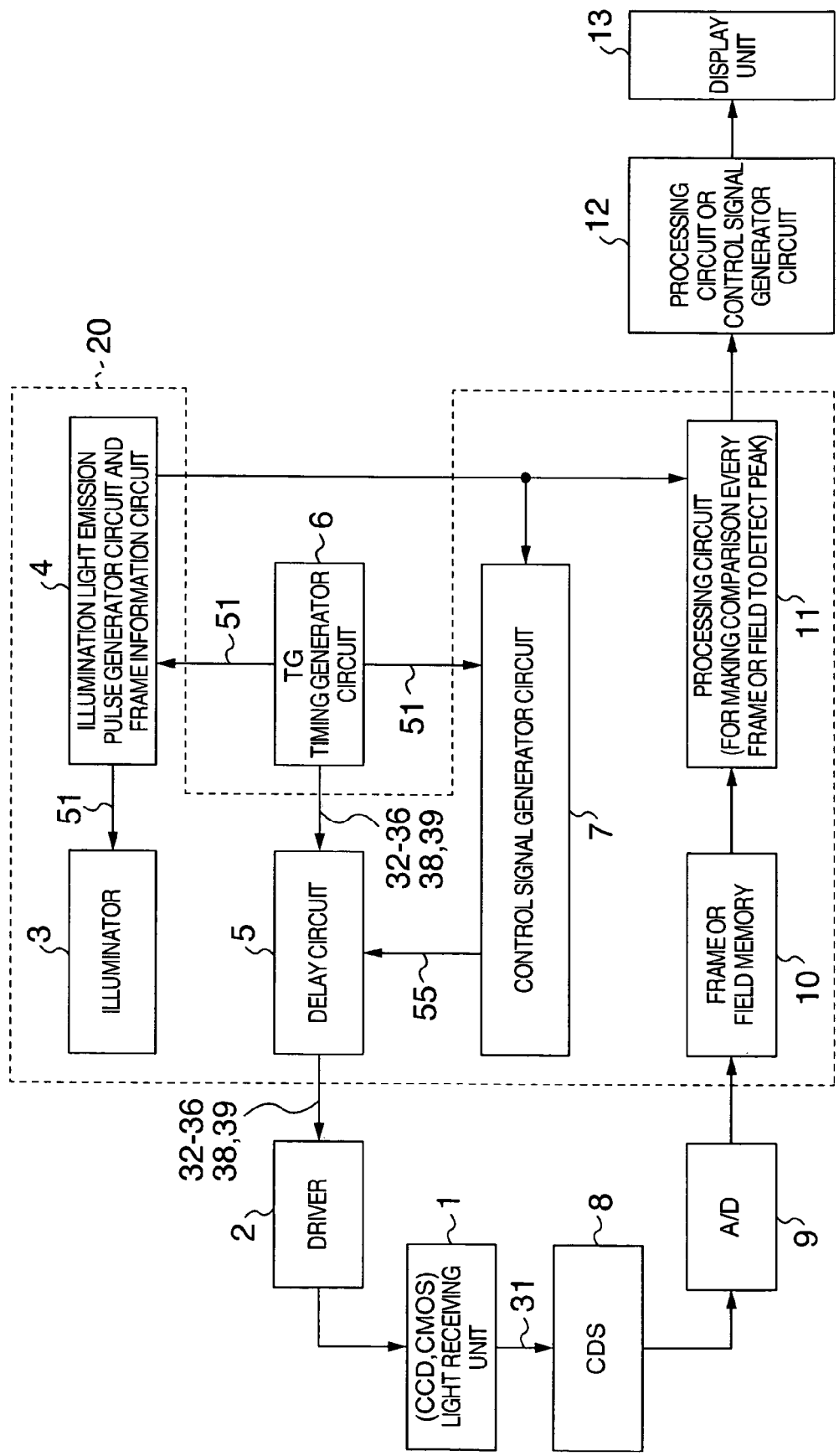

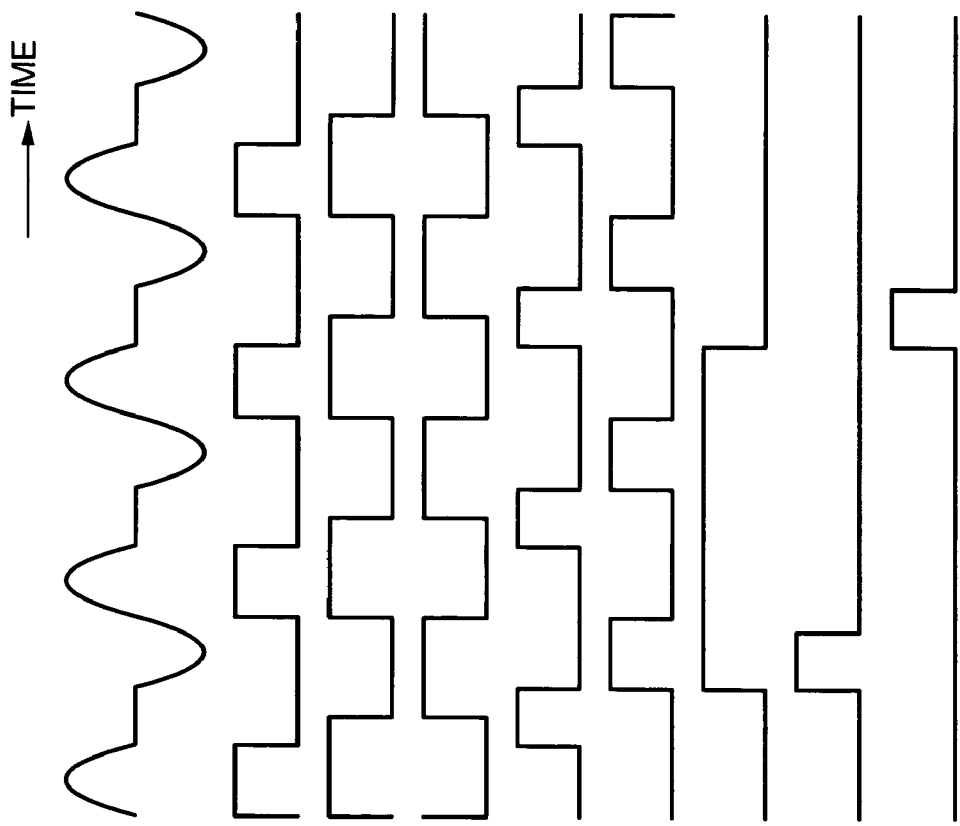

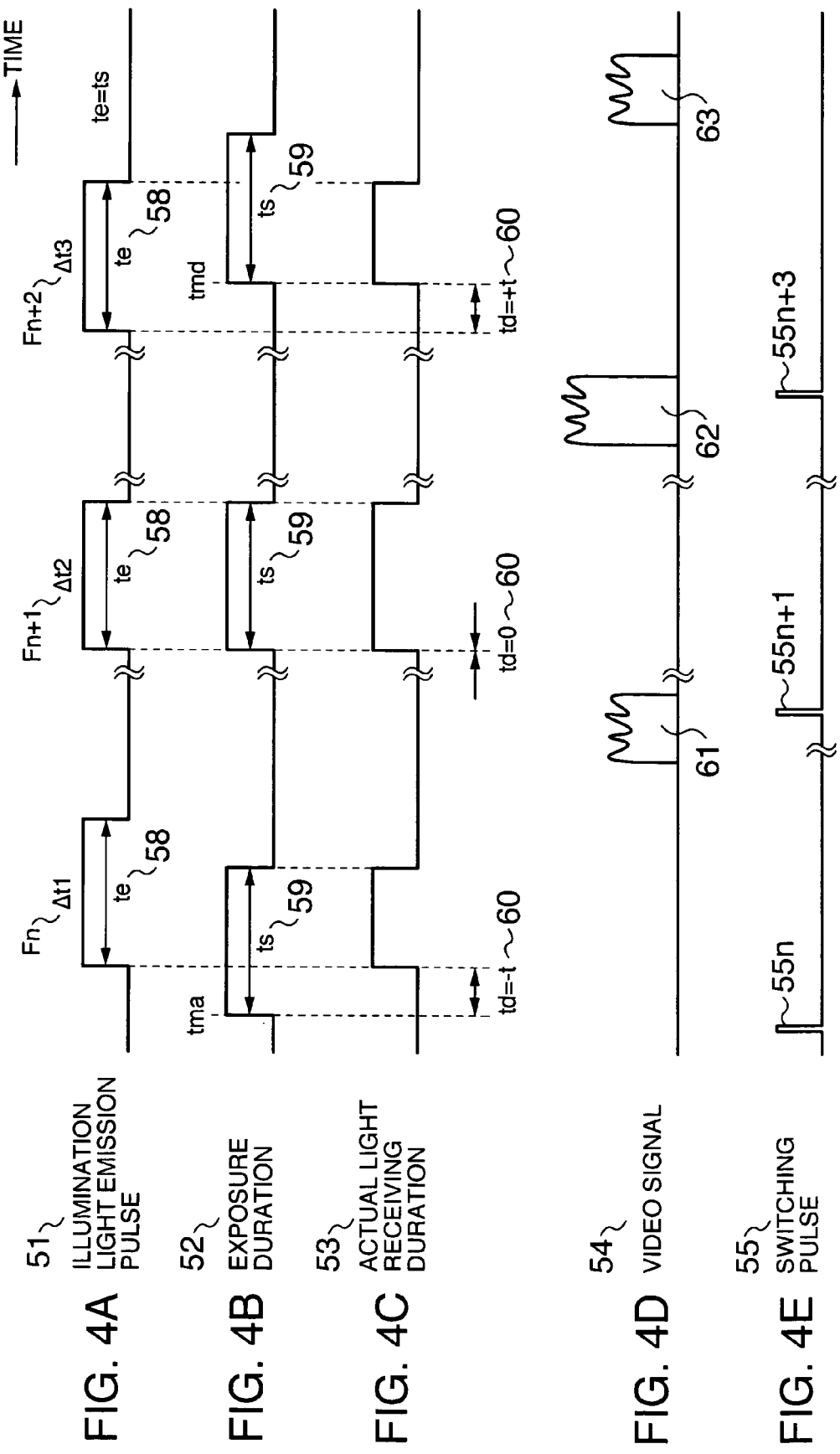

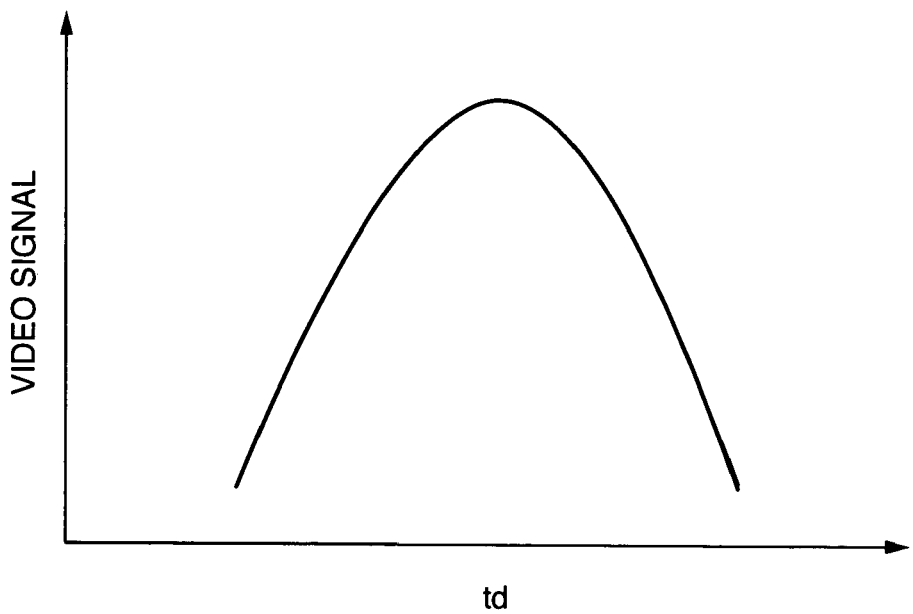

FIG. 12A
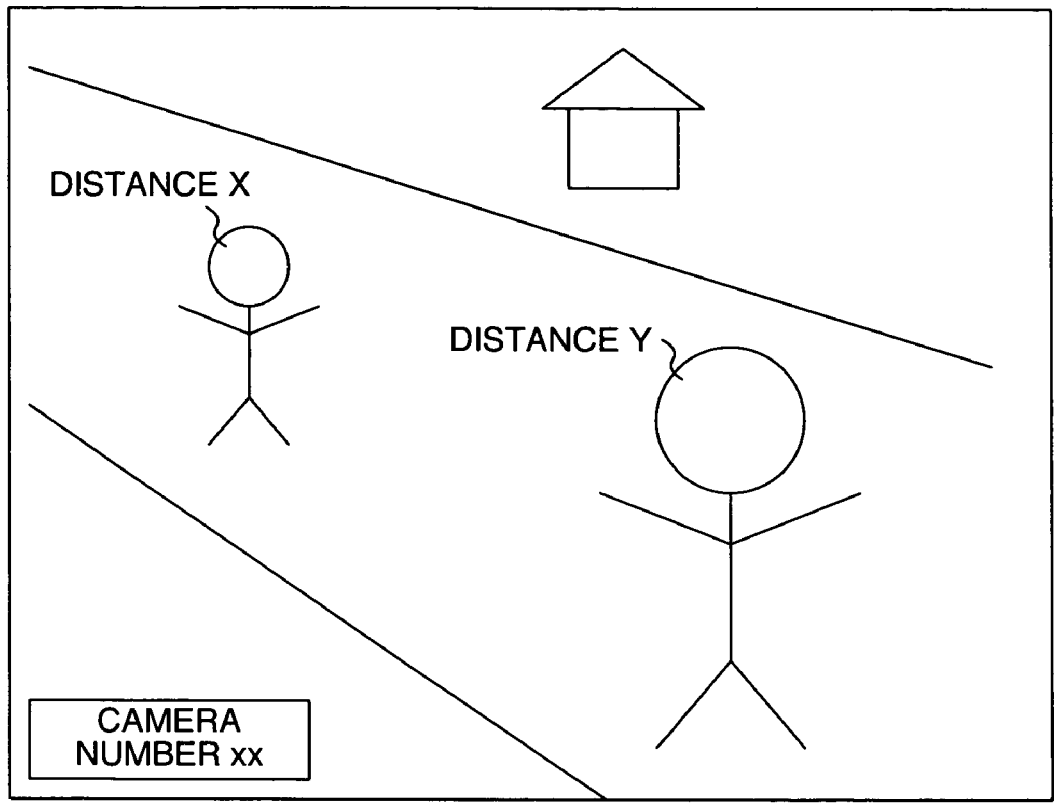
FIG. 12B
FIG. 12C
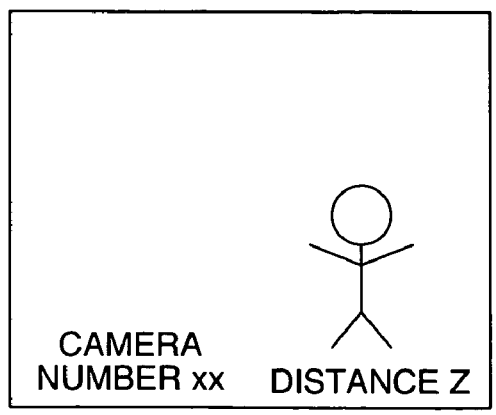

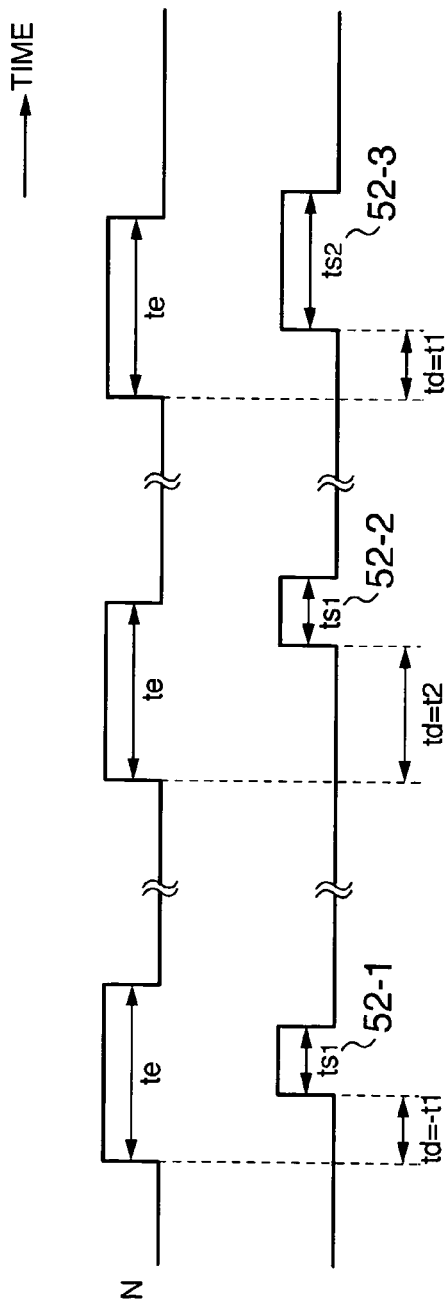

IMAGE-PICKUP APPARATUS AND METHOD HAVING DISTANCE MEASURING FUNCTION

INCORPORATION BY REFERENCE

The present application claims priority from Japanese application JP 2004-110981 filed on Apr. 5, 2004, the content of which is hereby incorporated by reference into this application.

BACKGROUND OF THE INVENTION

The present invention relates to an image-pickup apparatus having an image-pickup unit for imaging an object, and an image-pickup method, and more particularly, to an image-pickup apparatus and method having distance measuring function which can measure the distance, shape, and depth of an imaged object.

A typical example of a conventional image-pickup apparatus will be described with reference to FIG. 1.

FIG. 1 is a block diagram illustrating an exemplary camera which represents a conventional image-pickup apparatus. The camera illustrated in FIG. 1 is a CCD digital camera, wherein a timing generator circuit 23 generates a CCD driving pulse which is transferred to a CCD 21 through a driver 22 to produce a CCD output. A CDS (correlation double sampling) circuit 24 removes noise from the CCD output, and an A/D converter 25 converts the resulting CCD output to a digital form to provide an image output.

Techniques related to conventional image-pickup apparatuses are disclosed, for example, in JP-A-9-230230, JP-A-2003-346188, and JP-A-2000-055632. In the technique disclosed in JP-A-9-230230, a particular object is irradiated with light flux from a camera to measure the distance from the object based on an angle and position at which reflected light is received from the object. In the technique disclosed in JP-A-2003-346188, the distance to an object is measured with a parallax to create a three-dimensional image of the object based on the measured distance.

In the technique disclosed in JP-A-2000-055632, a time difference is measured for each of pixels of an image under measurement from the moment at which planer light (or parallel light) is emitted from a light emitter to an object under measurement to the moment at which reflected light from the object under measurement is received to reveal the shape of the object under measurement, i.e., the distance between respective sites on the object under measurement from the measured value.

SUMMARY OF THE INVENTION

In any of the conventional image-pickup apparatuses (cameras) disclosed in JP-A-9-230230 and JP-A-2003-346188, when an object under measurement is irradiated with light using an illuminator for imaging, the camera does not measure a time period from the moment at which the light is irradiated to the object under measurement to the moment at which the light reflected by the object under measurement is incident on the camera, thereby giving rise to a disadvantage of the inability to measure the distance between the object and the captured image based on the measured time period.

JP-A-2000-055632, in turn, has a disadvantage in that the image-pickup apparatus cannot measure the distance between the object under measurement and the captured image for each of pixels in the image of the object under measurement.

It is an object of the present invention to provide an image-pickup apparatus and method having a distance measuring function which eliminate the disadvantages of the prior art described above.

It is another object of the present invention to provide an image-pickup apparatus and method which are capable of measuring a time period from the moment at which an object under measurement is irradiated with light to the moment at which the light is incident on (received by) a camera for each of pixels in a captured image of the object under measurement to detect each of the pixels in the image of the object under measurement captured by the camera associated with the distance from an illuminator to the object under measurement.

To solve the problem of the prior art, according to a first aspect of the present invention, an image-pickup apparatus for capturing an object includes a light emitting unit for emitting irradiating light, a light receiving unit for receiving reflected light of the emitted irradiating light reflected from an object to capture an image of the object, a distance calculating unit for measuring a phase difference (time difference) from the emission of light from the light emitting unit to the reception of reflected light by the light receiving unit for each unit composed of a predetermined number of adjacent pixels of the object to calculate a distance from the image-pickup apparatus to each corresponding pixel unit of the object, and an image processing unit for corresponding the distance calculated in units of the predetermined number of pixels to the image captured by the light receiving unit.

Preferably, the image-pickup apparatus further includes a display unit, wherein the image processing unit supplies the display unit with only pixels corresponding to a predetermined range in the image generated by the distance calculating unit to display the pixels in units of the predetermined number of pixels.

Also preferably, the image processing unit supplies the display unit with the image generated by the distance calculating unit together with a distance corresponding to the unit of the predetermined number of pixels in the image to display the pixels on the display unit in units of the predetermined number of pixels together with the distance corresponding to the unit of the predetermined number of pixels.

Further preferably, the image-pickup apparatus further includes a display unit, wherein the display unit displays the image generated by the image processing unit in units of the predetermined number of pixels together with a distance corresponding to the pixel units.

Further preferably, the image-pickup apparatus further includes a phase controller for relatively changing a phase difference (time difference) between a light emission operation of the light emitting unit and a light receiving operation of the light receiving unit at first predetermined time intervals, wherein the distance calculating unit measures the amount of light received by the light receiving unit in predetermined pixel units for a second predetermined time interval longer by a factor of a plural number than the first predetermined time interval, finds a phase difference which results in the largest amount of received light in the predetermined pixel units, and calculates a distance from the image-pickup apparatus to a corresponding pixel unit of the object based on the phase difference which results in the largest amount of received light for each of the predetermined pixel units.

Further preferably, the second predetermined time interval is longer than the first predetermined time interval by a factor of three or more, and the phase controller sequentially and relatively changes the phase difference between the light emitting operation and the light receiving operation in succession at the first predetermined time intervals in each of the second predetermined time intervals.

The image-pickup apparatus and method provided by the present invention can measure a time period from the irradiation of light onto an object under measurement to the impingement (reception) of light by the camera to calculate the distance to the object under measurement from an image captured by the camera and the illuminator.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram illustrating an exemplary camera which is a conventional image-pickup apparatus;

FIG. 2 is a block diagram illustrating an image-pickup apparatus according to a first embodiment of the present invention;

FIGS. 3A to 3I are timing charts for explaining an exposure duration of a light receiving unit and the like in the first embodiment;

FIGS. 4A to 4E are timing charts for explaining an illumination light emission pulse, an exposure duration, and the like in the first embodiment;

FIG. 5 is a diagram showing a positional relationship between the image-pickup apparatus and an object under measurement in one embodiment of the present invention;

FIG. 6 is a graph showing the relationship between the difference between an illumination light emitting duration and an exposure duration and a video signal level in one embodiment of the present invention;

FIG. 7A is a graph showing video outputs associated with exposure durations at different phases, FIG. 7B is a schematic diagram of images for exposure durations at different phases, and FIG. 7C is a schematic diagram showing a selection of a pixel on a captured image;

FIG. 9 is a data map showing the distance between each pixel on an image of an object and a site on the object corresponding to each pixel;

FIGS. 12A to 12C are diagrams each showing an exemplary image captured by the image-pickup apparatus according to one embodiment of the present invention;

FIGS. 13A and 13B are timing charts for explaining the illumination light emission pulse, exposure duration and the like in a third embodiment of the present invention.

DETAILED DESCRIPTION OF THE EMBODIMENTS

Figure 7A:
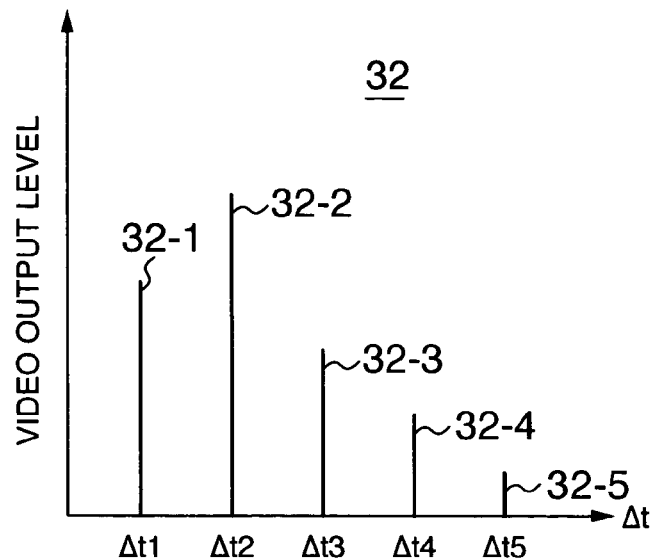
FIGS. 7A to 7C are diagrams for explaining the relationship between an image and a video output level in one embodiment of the present invention, where

In the following, some embodiments of the present invention will be described with reference to the accompanying drawings.

FIG. 2 illustrates in a block diagram form an image-pickup apparatus according to a first embodiment of the present invention. FIGS. 3A to 3I are timing charts for explaining an exposure duration of a light receiving unit 1 (CCD camera) in the first embodiment. FIGS. 4A to 4E are timing charts for explaining an illumination light emission pulse, an exposure duration and the like in the first embodiment.

In FIG. 2, a distance measuring unit 20 comprises an illuminator 3; an illumination light emission pulse generator circuit and frame information circuit 4; a delay circuit 5; a control signal generator circuit 7; a frame memory or a field memory 10; and a processing circuit 11.

The illuminator 3 emits diffuse light or planer light but does not emit laser light. When the image pickup apparatus covers a range of a monitored field of view only during the night or in a dark place, light reflected from an object is only the light from the light source for illumination which the image pick-up apparatus captures an image, so that the illuminator 3 may be, for example, any of a light emitting diode, a halogen light source, a xenon light source, a sodium light source, a tungsten light source and the like, or a plurality of these light sources. The image pick-up apparatus should have a light receiving sensitivity to visible light emitted by such illuminations.

On the other hand, for a monitored field of view which is bright in the daytime, light reflected from an object also includes light other than that from a light source for illumination with which the image pick-up apparatus captures an image, so that either a delay time or distance cannot be measured. Thus, a light source other than that for emitting visible light (for example, near infrared rays, ultraviolet rays or the like) may be used for an illumination with which the image pick-up apparatus captures an image, in which case the image pick-up apparatus should be sensitive to such a light source at wavelength other than the visible light. Alternatively, for example, a single-wavelength light source (for example, near infrared rays, ultraviolet rays or the like) which emits parallel light beams, may be used for an illumination with which the image pick-up apparatus captures an image, in which case the image pick-up apparatus should be sensitive to the light at a single wavelength emitted by such a light source (an optical filter may be used).

The timing generator circuit 6 applies a pulse 51 (FIG. 4A) to the illumination light emission pulse generator circuit and frame information circuit 4, delay circuit 5, and control signal generator circuit 7, respectively. In response to the pulse 51, the illumination light emission pulse generator circuit and frame information circuit 5 generates a pulse for driving the illuminator 3 (for example, a pulse generated at the same timing as the pulse 51 and having the same waveform as the pulse 51) which is applied to the illuminator 3 for forcing the same to emit light.

The timing generator circuit 6 also generates pulses for driving the light receiving unit 1 (horizontal transfer pulses 33 (H1), 34 (H2) (FIGS. 3C, 3D), an exposure duration start pulse 38 (FIG. 3H), an exposure duration end pulse 39 (FIG. 3I), and the like) and transfers the generated pulses to the delay circuit 5.

The control signal generator circuit 7 generates a switching pulse 55 (FIG. 4E) in synchronism with the pulse 51 from the timing generator circuit 6, for example, at predetermined time intervals and at a predetermined timing. The switching pulse 55 is generated at a phase timing before the illumination light emission pulse 51 rises and before a maximum phase timing (for example, a timing tma in FIG. 4B) of the exposure start pulse 38. Here, the predetermined time interval is switched, for example, every frame or every plural frames, or every field or every plural fields. In the example shown in FIG. 4A to 4E, it can be seen that the predetermined time interval is switched every frame, and the following description will be made on the shown example.

The light receiving unit driving pulses 32-26, 38-39 transferred from the timing generator circuit 6 to the delay circuit 5 are varied in phase in response to the switching pulse 55 (FIG. 4E) generated by the control signal generator circuit 7, such that an advance amount (td=−t) and a delay amount (td=+t) of the phase are varied with respect to a rising timing of the illumination light emission pulse. In this way, the phase of the light receiving unit driving pulses is sequentially switched in a plurality of stages (here, in three stages by way of example) in sequence in response to the switching pulse 55 each time the switching pulse 55 is outputted. Specifically, in the example shown in FIGS. 4A to 4E, as the delay circuit 5 is applied with a first switching pulse 55n in a first frame Fn, the delay circuit 5 advances the phase of the light receiving unit driving pulses by an advance amount (td=−t) with respect to the rising timing of the illumination light emission pulse. Next, as the delay circuit 5 is applied with a second switching pulse 55n+1 in the next frame Fn+1, the delay circuit 5 sets the advance amount to zero (td=0) (same timing) with respect to the rising timing of the illumination light emission pulse. Further, as the delay circuit 5 is applied with a third switching pulse 55n+2 in the next frame Fn+2, the delay circuit 5 delays the phase of the light receiving unit driving pulses by a delay amount (td=+t) with respect to the rising timing of the illumination light emission pulse.

The light receiving unit driving pulses 32-36, 38-39, the delay amount of which has been controlled by the delay circuit 5, are amplified by the driver 2, and then transferred to the light receiving unit (image-pickup unit or image-pickup camera) 1 (implemented by multiple CCDs or multiple image-pickup devices such as CMOS or the like) to generate a light receiver unit output 31 (image output) (FIG. 3A).

Here, an exposure duration 37 (FIG. 3G) is set to be a time period between the exposure start parse 38 (FIG. 3H) and exposure end pulse 39 (FIG. 3I).

When the output 31 of the light receiving unit 1 is delayed by the delay circuit 5, the reset gate pulse 32, horizontal transfer pulses 33, 34, and sample/hold pulses 35, 36 are all varied in phase by the same amount as the aforementioned advance amount or delay amount, in addition to the exposure start pulse 38 and exposure end pulse 39.

Alternatively, the control signal generator circuit 7 may select a delay amount or an advance amount in response to the pulse 51, and provides the delay circuit 5 with the selected delay or advance amount to control the phase of the exposure start pulse 38, exposure end pulse 39, and the like.

The output generated by the light receiving unit 1 passes through the CDS circuit, is converted to a digital form by the A/D converter 9, and is transferred to the frame memory or field memory 10.

The transferred image is processed by the processing circuit 11 to detect a peak value (image level) for each pixel at the same pixel position (same address) in the image of an object in a predetermined time period (for example, within three frames Fn-Fn+2 in the foregoing example) based on the switching pulse 55 (or a signal indicative of a frame number or a field number) transferred from the illumination light emission pulse generator circuit and frame information circuit 4. The result is transferred to a processing circuit or control signal generator circuit 12. Here, the illumination light emission pulse generator circuit and frame information circuit 4 provides a frame number or a field number to the processing circuit 11 in response to the horizontal transfer pulses 33 (H1), 34 (H2) applied thereto from the timing generator circuit 6.

As will be later described, the control signal generator circuit 12 calculates the distance between the light receiving unit 1 and each site on an object under measurement based on the frame number of field number transferred from the illumination light emission pulse generator circuit and frame information circuit 4, and the delay amount td in the delay circuit 5 when the peak value is detected. The distance is calculated for each of pixels on the image of the object under measurement.

The delay circuit 5 varies the phase of an exposure duration of the light receiving unit 1 with respect to an illumination light emitting time by a delay amount with reference to a reference time (for example, a time period from the light emission to the reception of reflected light when the distance to the object under measurement is set to 3.0 m).

FIG. 5 is a diagram showing a positional relationship (or positional arrangement) between an image-pickup device and an object under measurement in one embodiment of the present invention. The image-pickup apparatus comprises a camera 43 including a light receiving unit 1, and an illuminator 42. The camera 43 and illuminator 42 are positioned such that the distance 44 (L1) from an object under measurement (object) 41 to the illuminator 42 and the distance 45 (L2) from the object under measurement 41 to the light receiving surface of the light receiving unit 1 in the camera 43 are constant.

The camera 43 is moved by a pan/tilt unit such as a panhead to orient the image-pickup direction of the camera 43 toward the object under measurement. Of course, the illumination 42 is also moved in association with the pan/tilt unit and the camera 43. In this event, the distance L from the light receiving unit 1 to each site on the object under measurement is calculated in the following manner using the delay amount td (seconds) provided by the delay circuit 5 when a peak value is detected:

$$L = \text{Delay Amount td} \times \text{Speed of Light per Second} + \text{Reference Distance (for example, 3 m)} \quad (1)$$

The relationship between a light emitting duration te (58) and an exposure duration ts (59) will be described in detail with reference to the timing charts shown in FIGS. 4A to 4E. FIGS. 4A to 4E show timing charts when the phase of the exposure duration 52 is changed with respect to the illumination light emission pulse 51 in three stages, by way of example.

Here, the illumination light emitting duration te (58) and exposure duration ts (59) are limited to predetermined durations, respectively. In a frame 55 in which the illumination light emission pulse has a pulse duration $\Delta t1$ which defines the light emitting duration te, the exposure duration 52 advances in phase from the illumination light emission pulse 51, so that a smaller portion of the exposure duration 52 overlaps with the light emitting duration te, as can be recognized from an actual light receiving duration 53, resulting in a lower image level 61 on an image signal axis 54.

In a frame 57 in which the illumination light emission pulse has a duration $\Delta t3$ which defines the light emitting duration te, the exposure duration 52 delays in phase from the illumination light emission pulse 51, so that a smaller portion of the exposure duration 52 overlaps with the light emitting duration te as is the case with the frame 55 having the duration $\Delta t1$, resulting in a lower image level 63 on the image signal axis 54.

When the illumination light emission pulse 51 completely matches with the exposure duration 52, as in a frame 56 in which the illumination light emission pulse has a pulse duration $\Delta t2$ which defines the light emitting duration te, the actual light receiving duration 53 increases, resulting in a higher image level 62 on the image signal axis 54.

The phase differences (between the illumination light emission pulse and the exposure duration) at these image levels (61, 62, 63) are relied on as reference times (distances) to determine whether or not the distance between an object under measurement and the camera is shorter or longer than the reference by checking whether the phase of the exposure duration 52 advances or delays with respect to the illumination light emission pulse 51 at that time. Then, the distance between the object under measurement and the camera is detected in accordance with a time difference 60 between the illumination light emitting duration and the exposure duration (whether td is minus or plus).

As the time difference 60 between the illumination light emitting duration and the exposure duration is more negative, the object under measurement is closer to the camera than the reference distance. Conversely, as the time difference 60 is more positive, the object under measurement is further away from the camera than the reference distance.

FIG. 6 is a graph showing the relationship between the difference between the illumination light emitting duration and the exposure duration and the image signal level in one embodiment of the present invention. Specifically, FIG. 6 shows the relationship between the time difference td (60) between the illumination light emitting duration and the exposure duration and the image signal based on FIGS. 4A to 4E described above, in which case the image signal level reaches a peak value when td=0.

Figure 7B:
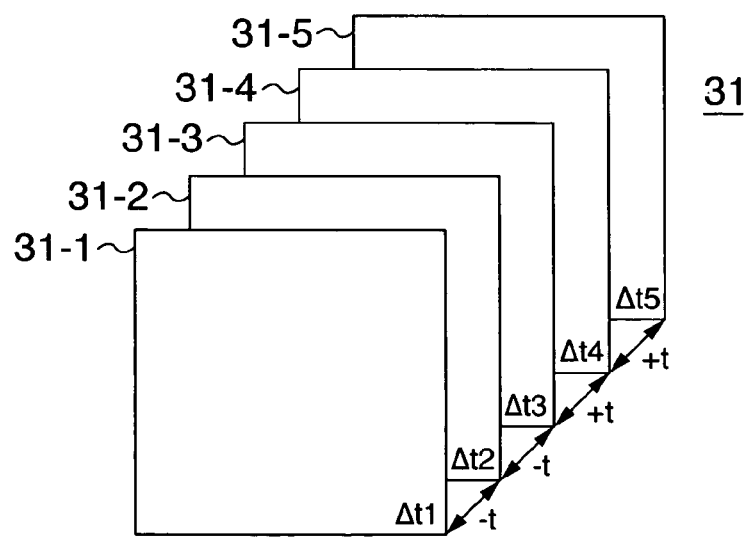
Figure 7C:
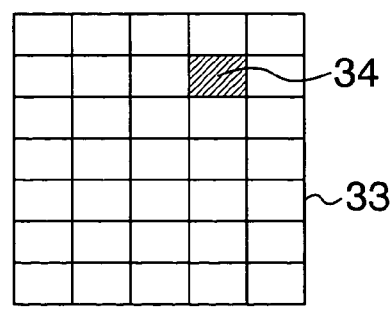

FIGS. 7A to 7C are diagrams for explaining the relationship between an image and an image output level in one embodiment of the present invention, where FIG. 7A is a graph showing the level of each image output from the light receiving unit 1 for each delay amount in a predetermined peak detection period (here, five frames); FIG. 7B is a schematic diagram representing frame images associated with respective delay amounts td (=$\Delta t1$ to $\Delta t5$); and FIG. 7C is a diagram showing a selection of a pixel in a frame image. Specifically, FIG. 7B shows five output frame images 31 (31-1-31-5) corresponding to the respective phases when the phase of exposure timing with respect to the illumination light emission timing is varied (by a delay amount td) in a plurality of stages (here, for example, five stages). Assume herein that the respective delay amounts are $\Delta t1=-2t$, $\Delta t2=-t$, $\Delta t3=0$, $\Delta t4=+t$, and $\Delta t5=+2t$. Also, the level of an image output is shown for a pixel (here, a pixel 34 in FIG. 7C) at the same pipel position (same address) in an image generated from the light receiving unit 1 associated with each of the delay amounts $\Delta t1$-$\Delta t5$ within the predetermined peak detection period (five frames). This example shows that the output level reaches a peak value (image level) when the delay amount is $\Delta t2$.

In the foregoing relationship, since the image output level is the highest at $\Delta t2$, the distance from the camera to the object under measurement is the distance measured from the duration of $\Delta t2$. The distance to a site of the object under measurement corresponding to the selected pixel 34 is calculated by the aforementioned equation (1) from the duration of $\Delta t2$ (or from Distance=(Speed of Light $\times \Delta t$)/2 when no reference distance is set).

Likewise, a delay amount which causes the output level to reach a peak value (image level) is detected for each of the remaining pixels, and the distance to a site of the object under measurement corresponding to that pixel is calculated based on the delay amount or advance amount which results in the peak value. In this way, the distance to each site of the object under measurement is calculated.

Figure 8:
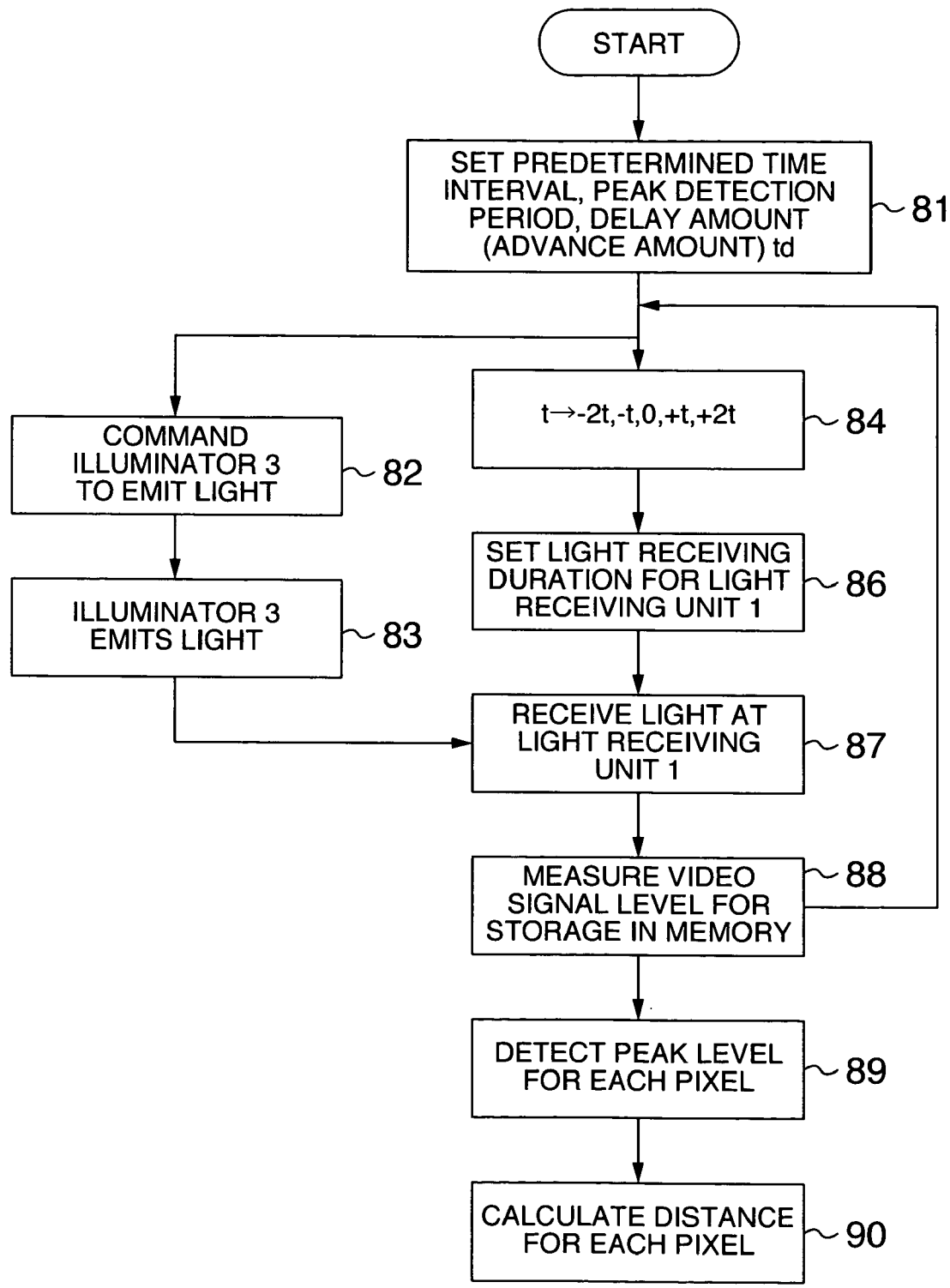
FIG. 8 is a flow chart for explaining the operation of the first embodiment.

The foregoing operation will be described with reference to a flow chart of FIG. 8. For simplicity, the following description will be made for an example in which the phase of the exposure duration is changed, for example, on a frame-by-frame basis.

First, at step 81, the delay circuit 5 sets a phase advance amount (td=−t) and delay amount (td=+t). For example, t is a value within a range of 50 to 100 nS. Further, at step 81, a predetermined time interval and a predetermined peak detection period are also set in the delay circuit 5 and/or control signal generator circuit 7.

Next, at step 82, the illumination light emission pulse 51 is applied from the circuit 4 to the illuminator 3, so that the illuminator 3 emits light (step 83). Next, at step 84, the delay circuit 5 sets the advance amount td to −2t, so that the phase of the exposure start pulse 38 and exposure end pulse 39 is advanced with respect to the illumination light emission pulse 51, and advanced exposure start pulse 38 and exposure end pulse 39 are outputted from the delay circuit 5. Next, at step 87, the light receiving unit 1 receives reflected light from the object for an exposure duration determined by the exposure start pulse 38 and exposure end pulse 39. At step 88, a received image signal is stored in the memory 10, and the processing circuit 11 measures an image output level for each of pixels in an image of the object based on the data of the received image signal, and once or temporarily stores the measured image output levels in the memory 10.

Next, the flow returns to step 84, where the delay circuit 5 sets the advance amount td to −t, followed by the execution of steps 82, 83. Further, at step 86, the light receiving unit 1 receives reflected light from the object for an exposure duration determined by the exposure start pulse 38 and exposure end pulse 39, the phase of which is determined by the changed advance amount td. At step 88, the received image signal is stored in the memory 10, and an image output level is measured for each of pixels in an image of the object, and once or temporarily stored in the memory 10.

Likewise, when the delay circuit 5 sets the delay amount td to zero (td=0), to +t (td=+t), and to +2t (td=2td), steps 82, 83, 84, 86, 87, 88 are also executed in a similar manner.

After the foregoing steps have been executed, the processing circuit 11 detects a peak value (image level) within a predetermined peak detection period (for example, five frames) for each of pixels in the image of the object based on the data of the image signal received for the predetermined peak detection period (for example, five frames) stored in the memory 10 at step 89.

Next, at step 90, the circuit 12 calculates a distance corresponding to the delay amount which resulted in a peak value for each of pixels in the image of the object within the field of view of the image pickup apparatus based on the aforementioned equation (1). The distance corresponding to the delay amount which resulted in a peak value reached by the image level at each of the pixels in the image of the object is regarded as the distance to a site of the object corresponding to the pixel. It is therefore possible to improve the accuracy of the distance to a site of the object corresponding to a pixel as the predetermined peak detection period is set longer to increase the number of exposure periods which differ in phase.

FIG. 9 is a data map showing respective pixels in a range from 34-11 to 34-76 in an image of the object and distances d11-d76 to sites of the object corresponding to the respective pixels calculated in the foregoing manner. These data may be once or temporarily stored in and outputted from, for example, a memory within the circuit 12. Specifically, the respective pixels in a range from 34-11 to 34-76 in the image of the object are stored in the memory in correspondence to the distances in a range from d11 to d76 to sites of the object corresponding to the respective pixels, i.e., in association with the distances d11-d76.

When the distances have been detected in a single predetermined peak detection period in this way, the distance is calculated sequentially for each of the pixels in the image of the object in a similar manner for a predetermined peak detection period of the next five frames.

The image of the object and the associated distances found by the circuit 12 may be outputted to the display unit 13 for display as shown in FIG. 12A, later described. Also, as shown in FIG. 12B, later described, an image within a particular distance (for example, 1-5 m from the image-pickup apparatus) may be extracted from the captured image for display, together with an associated distance, if desired.

Figure 10:
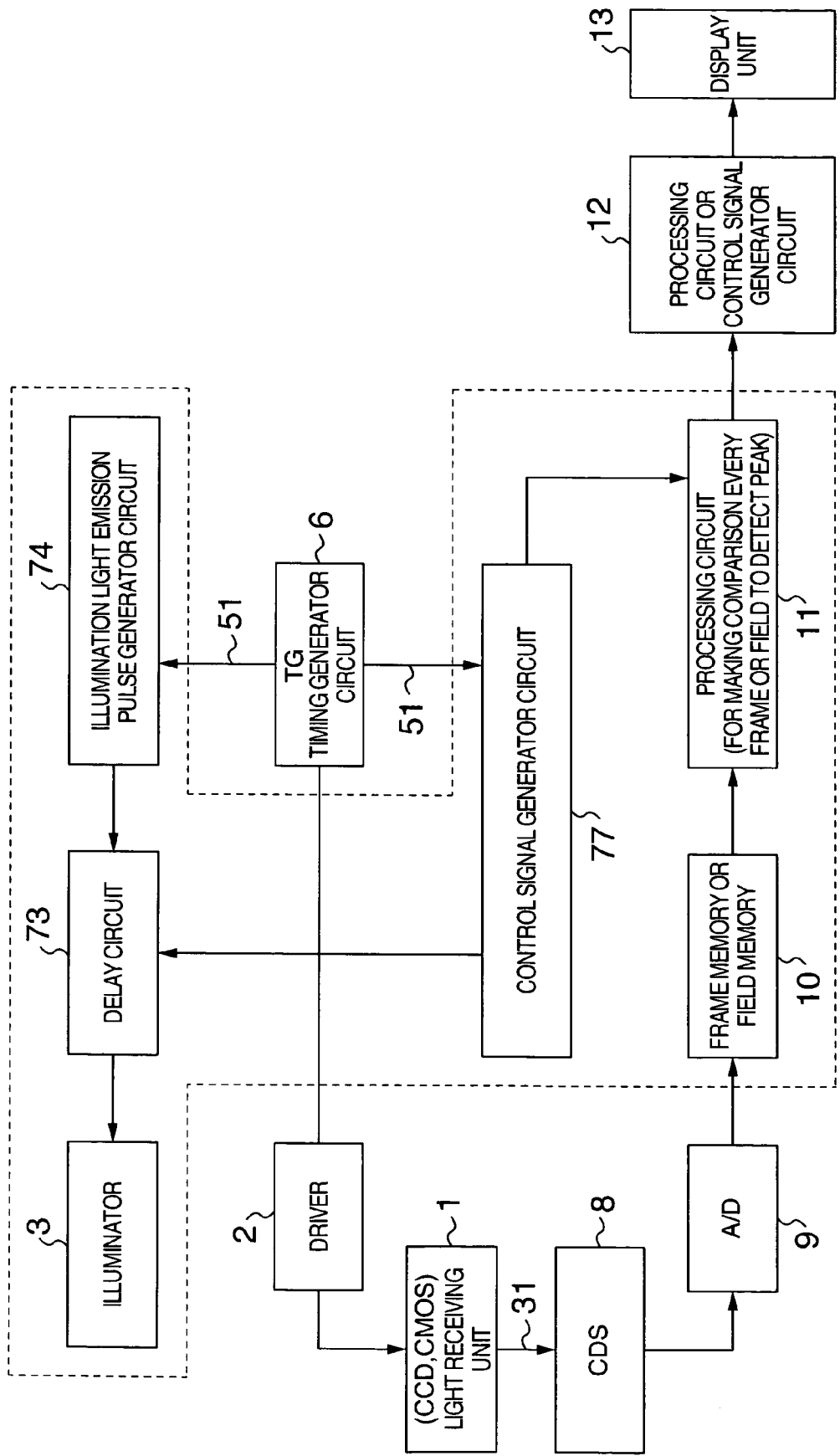
FIG. 10 is a block diagram illustrating an image-pickup apparatus according to a second embodiment of the present invention.

FIG. 10 illustrates in a block diagram form an image-pickup apparatus according to a second embodiment of the present invention. In FIG. 2, components having the same functions as those in the first embodiment illustrated in FIG. 2 are designated the same reference numerals, and are omitted in the following description.

A timing generator circuit 6 applies a pulse 51 to an illumination light emission pulse generator circuit 74 and control signal generator circuit 77. In response to the pulse 51 from the timing generator circuit 6, the illumination light emission pulse generator circuit 74 generates pulses for emitting light, and transfers the pulse to an illuminator 3 through a delay circuit 73, forcing the illuminator 3 to emit light. In this event, the delay circuit 73 controls the phase of the illumination light emission pulse in response to a switching pulse 55 from the control signal generator circuit 77 to switch a phase advance amount or delay amount for the illumination light emission pulse at intervals of predetermined time (every frame or every plural frames, or every field or every plural fields). The illumination light emission pulse thus delayed in phase is applied to the illuminator 3, forcing the illuminator 3 to emit light.

Alternatively, the control signal generator circuit 77 may select a delay amount or an advance amount in response to the pulse 51, and the selected delay amount or advance amount is applied the delay circuit 73 to control the phase of the illumination light emission pulse.

The timing generator circuit 6 also generates pulses for driving a light receiving unit 71 (a transfer pulse, an exposure duration pulse), and transfers the generated pulses to the light receiving unit 71 through a driver 75 to generate a receiving unit output (image output). The generated receiving unit output passes through a CDS circuit 78, is converted to a digital form by an A/D converter circuit 79, and is transferred to a frame memory or a field memory 80.

Also, the control signal generator circuit 77 outputs a switching pulse 55 (or a signal indicative of a frame number or a field number) at predetermined time intervals to a processing circuit 11 based on the pulse 51 from the timing generator circuit 6.

The processing circuit 11 detects a peak value (image level) within a predetermined peak detection period for each of pixels in the transferred receiving unit output (image) with the aide of the switching pulse 55 outputted from the control signal generator circuit 77 to transfer the peak value (image level) for each pixel at the same pipel position (same address) to the control signal generator circuit 12.

The distance from the light receiving unit 1 to a site of the object under measurement corresponding to each pixel is calculated based on the peak value detected on a pixel-by-pixel basis and a predetermined delay amount associated with a predetermined frame number or field number.

In the second embodiment illustrated in FIG. 10, the phase of the illumination light emitting duration is varied with respect to the exposure duration of the light receiving unit, whereas in the first embodiment illustrated in FIG. 2, the phase is varied at predetermined time intervals for the exposure duration of the light receiving unit with respect to the illumination light emitting duration to generate an image output.

Specifically, in the second embodiment, the delay circuit 73 delays the illumination light emission pulse generated by the illumination light emission pulse generator circuit 74 for a delay amount selected by the control signal generator circuit 77 based on switching at predetermined time intervals, and then the delayed illumination light emission pulse is transferred to the illuminator 3 for emitting light. Also, the illumination light emission pulse is delayed with reference to the exposure duration pulse generated by the timing generator circuit 6.

Figure 11:
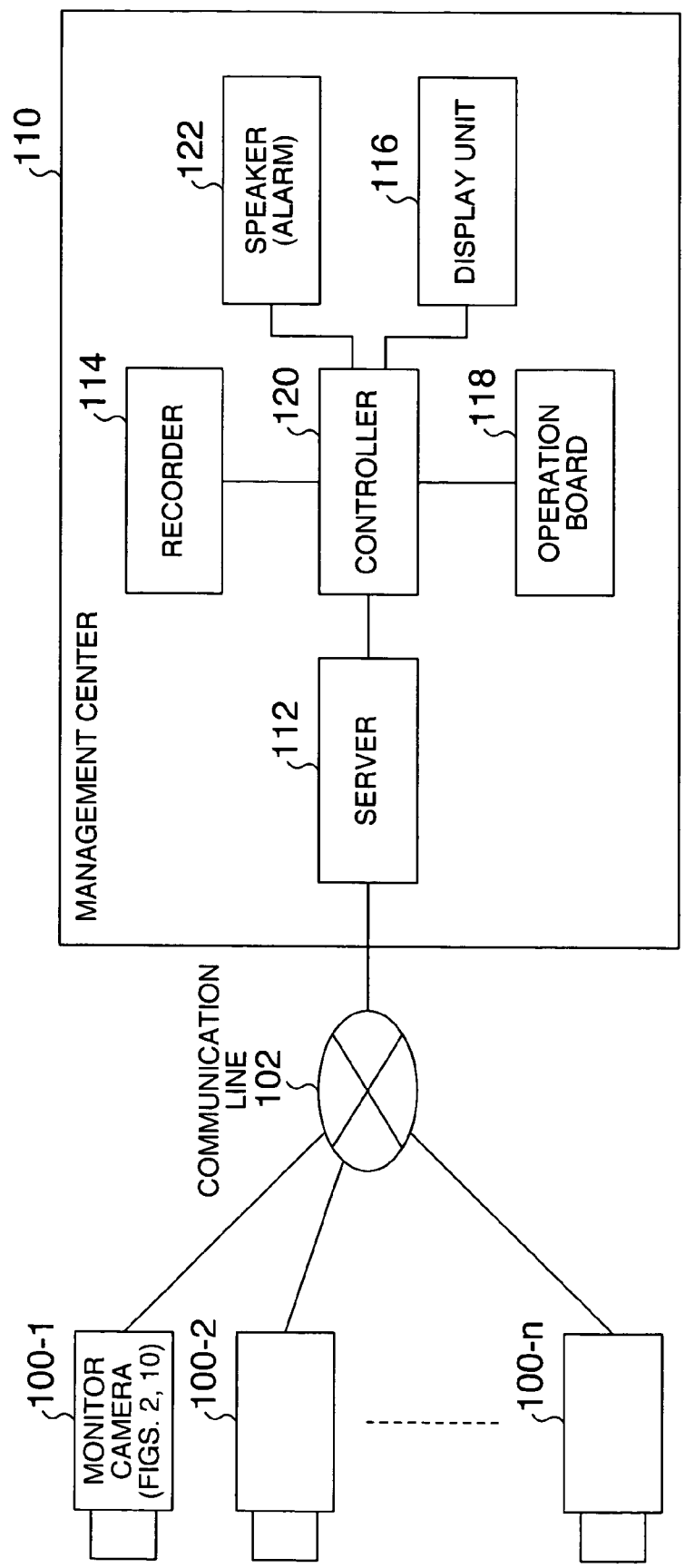
FIG. 11 is a block diagram illustrating an implementation of a monitor camera system using the image-pickup apparatus according to one embodiment of the present invention.

FIG. 11 is a block diagram illustrating an embodiment of a monitor camera system which employs the image-pickup apparatus according to one embodiment of the present invention. Such a monitor camera system is disclosed, for example, in U.S. Pat. No. 6,466,260.

FIG. 11 illustrates a networked monitor camera system which employs a plurality of the image-pickup apparatuses of the embodiment illustrated in FIG. 2 or FIG. 10. For example, n image-pickup apparatuses (monitor cameras) 100-1, 100-2, ---, 100-n, identical in configuration to that in FIG. 2 or FIG. 10 are coupled to a management center 110 through a communication line 102.

The management center 110 comprises a server 112 dedicated to input/output operations to/from a network; a recorder 114 for recording an image transmitted from each of the image-pickup apparatuses through the communication line 102, server 112, and a controller 120; a display unit 116 for selectively displaying image data captured by the respective image-pickup apparatuses under the control of the controller 120; an operation board 118 such as a keyboard through which an operator can enter a variety of operations such as switching of a displayed image from one image-pickup apparatus to another; and the controller 120 for controlling these components. An alarm generator 122 such as a speaker is also coupled to the controller 120. The server 112 may include a recorder and a controller.

Each image-pickup apparatus transmits a captured image within an associated monitoring area, and data on the distance to an object in the captured image to the management center 110 through the communication line 102.

FIGS. 12A to 12C show examples of displayed images captured by the image-pickup apparatus according to one embodiment of the present invention. FIG. 12A is an exemplary display of an image captured by a monitor camera, additionally including the distance to each object together with identification information of the monitor camera which has captured the image, for example, a camera number. An image monitored by one of the respective monitor cameras (image-pickup apparatuses) may be displayed on the display unit 116 of FIG. 11. Alternatively, images captured by a plurality of monitor cameras may be displayed in divided areas of the screen, as shown in FIG. 12C. FIG. 12B is an example of displaying only an image which is present within a specific range (for example, within 1 to 5 meters from the monitor camera), extracted from the image captured by the monitor camera (image within the field of view of the camera), shown in FIG. 12A. Likewise, the distance to the object, and the number of the monitor camera which captured the image are displayed together with the image of the object. In the display shown in FIG. 12B, the circuit 12 extracts data on only pixels which are positioned within the specific range, outputted from the monitor camera, together with the associated distance data.

Such a display format, i.e., a selection of at least one monitor camera, the captured image of which should be displayed, the presence or absence of the camera number of a monitor camera which captured the image which is to be displayed, and the like can be set on the operation board 118.

For example, if each monitor camera senses an object under measurement (object) as an "intruder" when the object under measurement approaches within a3 predetermined distance, the image captured by this monitor camera within its field of view is displayed as shown in FIG. 12B to present in an enlarged view the intruder sensed by the monitor camera together with the camera number.

In this event, each of the monitor cameras may output only an image within the same specific range, or the respective monitor cameras may output only images within different ranges from one another.

Here, in accordance with predetermined ranges set for the respective monitor cameras, if an object under measurement (object) approaches within a predetermined range, an image is displayed for each predetermined range. Therefore, if no object exists within a predetermined range, nothing is recognized and hence no image is displayed.

When intruding objects are present within a predetermined range X (X1-Xn), intruding objects within the range X can be displayed by extracting an intruding object at a distance X2 and an intruding object at a distance X3 and ignoring an image out of the range X (i.e., background image).

Two or more predetermined ranges may be set in the field of view. Specifically, a plurality of ranges (X, Y, . . . ) may be defined, where a display color or a display contrast may be set for each of the ranges, so that an object under measurement can be displayed in a three-dimensional image.

Each of the monitor cameras may output an image captured thereby as it is, such that the management center 110 selectively extracts only an image within a specific range for display on the display unit 116.

Also, if an object under measurement invades in a particular range or a particular region, the speaker (alarm generator) 122 may generate an alarm. The alarm generator is not limited to the speaker, but an alarm lamp or the like may be used instead.

In each of the embodiments described above, an image is captured at three or five different phases within a predetermined peak detection period, but the number of phases may be any number equal to or larger than three in the present invention.

Also, each of the embodiments described above has given an example in which the predetermined period is chosen to be one frame, but the predetermined period may be changed as appropriate in accordance with a moving speed of a particular object under measurement.

In the present invention, assume that the number of frames per second is approximately 30 frames per second when an object under measurement is a pedestrian or the like, and approximately 100 to 200 frames per second when an object under measurement moves at high speeds such as an automotive vehicle or the like.

Also, in each of the embodiments described above, a peak value (image level) is detected for each pixel within a predetermined peak detection period to calculate the distance to a site of an object under measurement corresponding to that pixel, but the present invention is not limited to this way of calculating the distance. For example, a plurality of adjacent pixels may be grouped into one unit, and a peak value (image level) may be detected on a unit-by-unit basis within a predetermined peak detection period to calculate the distance to a site of an object under measurement corresponding to that unit, and display the calculated distance. Here, a plurality of adjacent pixels may be a plurality of pixels adjacent in the horizontal scanning line direction, or a plurality of pixels adjacent in the vertical scanning line direction, or a plurality of pixels adjacent in the horizontal scanning line direction and vertical scanning line direction.

Next, a third embodiment of the present invention will be described with reference to FIGS. 13A, 13B. The third embodiment is similar in configuration to that illustrated in FIG. 2. In the third embodiment, the illumination light emission pulse 51 may be generated at predetermined time intervals and may have a constant pulse width (light emission duration te), as is the case with the first embodiment. In the third embodiment, a light receiving duration of the light receiving unit 1 and a delay time with respect to the illumination light emission pulse are set to desired values to receive and display an image of an object under measurement which is present within a desired range. Therefore, as shown in FIG. 13A, the illumination light emission pulse 51 may be the same as that shown in FIG. 4A.

On the other hand, the exposure pulse (exposure duration) 52 has its pulse width d and a delay time with respect to the illumination light emission pulse 51 set in an arbitrary manner to receive an image of an object under measurement which is present within a desired range. For example, an exposure pulse 52-1 has a pulse width ts1 and a rising edge delayed by a time td (=t1) with respect to a rising edge of the illumination light emission pulse 51. An exposure pulse 52-2 in turn has a pulse width ts1 and a rising edge delayed by a time td (=t2) with respect to the rising edge of the illumination light emission pulse 51 (where t1<t2). Further, an exposure pulse 52-3 has a pulse width ts2 (where ts1<ts2) and a rising edge delayed by a time td (=t1) with respect to the rising edge of the illumination light emission pulse 51.

Figure 14A:
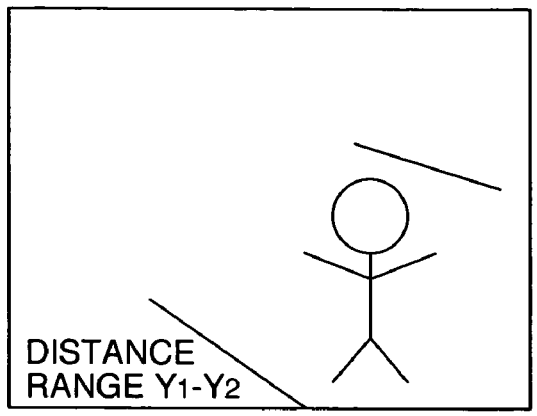
FIGS. 14A to 14C are diagrams illustrating exemplary displays of images captured in the third embodiment.
Figure 14B:
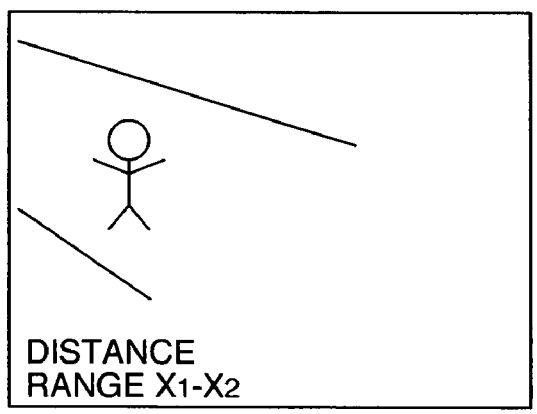
Figure 14C:
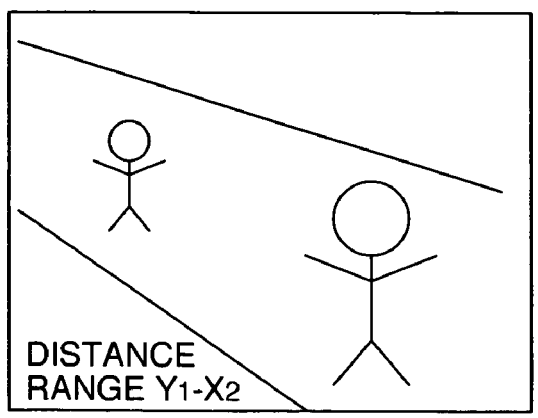

In this embodiment, by appropriately setting the pulse width ts and delay time td, an image of an object within an arbitary range can be received for display, for example, in the image captured by the monitor camera illustrated in FIG. 12A. For example, the exposure pulse 52-1 may be used to receive and display the image of the object within a range Y1-Y2 (Y1<Y2) (FIG. 14A). The exposure pulse 52-2 may be used to receive and display the image of the object within a range X1-X2 (X1<X2) (FIG. 14B). Further, the exposure pulse 52-3 may be used to receive and display the image of the object within a range Y1-X2 (Y1<X2) (FIG. 14C). In addition, the distance (range) may be displayed together with the displayed image, in a manner similar to the foregoing embodiments.

As will be appreciated from the foregoing, in the third embodiment, the image pickup apparatus for capturing an object includes: a light emitting unit (3) for emitting irradiating light for a predetermined time period at predetermined time intervals; a light receiving unit (1) for receiving the emitted irradiating light reflected from the object to capture an image of the object; a control unit (5, 6, 7) for controlling a delay time until the light receiving unit starts receiving the light, with respect to the time the light emitting unit started emitting the light, and a duration of the light reception on the light receiving unit; and a display unit (13) for displaying the image captured by the light receiving unit.

When the camera captures, within the field of view, an image of an object to be monitored which is estimated to move in a direction lateral to the field of view (for example, from left to right in FIG. 12A), the exposure pulses 52-1, 52-2, 52-3 need not be varied in width in accordance with the distance (or the delay time) because the relative distance is substantially constant between the camera or illumination and the object to be monitored. However, when the object to be monitored within the field of view of the camera is estimated to move in a direction perpendicular to the field of view (for example, from front to back or in an oblique direction in FIG. 12A), the exposure pulses 52-1, 52-2, 52-3 must be varied in width in accordance with the distance (or delay time) because the relative distance between the camera or illumination and the object to be monitored varies following movements of the object to be monitored. Specifically, the exposure pulses 52-1, 52-2, 52-3 should be adjusted to have a larger width as the object to be monitored is closer to the camera or illumination and to have a smaller width as the object to be monitored is further away from the camera or illumination.

According to the first embodiment of the present invention described above, the illuminator and camera are installed at fixed positions with constant distances from the illuminator and camera to an object under measurement and with a variable delay and advance amount given to the phase of an exposure duration for the light receiving unit with respect to the illumination light emitting duration.

Also, the phase of the exposure duration for the light receiving unit with respect to the illumination light emitting duration is varied at predetermined time intervals (for example, every frame or every plural frames, or every field or every plural fields) to generate an image output.

Further, the image-pickup apparatus has a frame memory or a field memory and a processing circuit to detect a peak value (image level) for each pixel at the same pipel position (same address) based on captured images within a predetermined peak detection period. Next, the distance to a site of the object under measurement corresponding to that pixel is calculated based on a delay amount or advance amount which results in the peak value. In this way, the distance to each site of the object under measurement is calculated.

According to the second embodiment of the present invention, the illumination light emitting duration is varied corresponding to an exposure duration for the light receiving unit. The illuminator and camera are installed at fixed positions, and the phase of the illumination light emitting duration is varied at predetermined time intervals (for example, every frame or every plural frames, or every field or every plural fields) with respect to the exposure duration for the light receiving unit to generate an image output. Subsequently, the image is processed in the frame memory or field memory and the processing circuit to detect a peak value (image output) for each pixel at the same pipel position (same address) in a predetermined peak detection period to calculate a time period from the light emission to the impingement of reflected light on the light receiving unit of the camera. Then, a time period from the irradiation of the object under measurement with light to the impingement of reflected light on the camera is measured based on the calculated time period. Finally, the distances from the camera and illuminator to the object under measurement can be found from the measured time period.

Also, according to one embodiment of the present invention, since the distance from the camera to an object under measurement can be measured simultaneously together with the shape and depth of the object under measurement, the object under measurement can be three-dimensionally displayed with the aid of the effect of the color and contrast of the display. Accordingly, the image-pickup apparatus of the present invention can be applied to three-dimensional shape measurements as well.

When the image-pickup apparatus as described above is applied in a monitor camera system, an intruder can be displayed only when the intruder is sensed.

Further, when such a monitoring camera system is applied to a noctovision camera for use during the night, illumination light out of the visible region can be used for the illumination of the image-pickup apparatus, leading to an implementation of a particularly effective monitor system.

According to the present invention, the image-pickup apparatus has an illuminator and a camera installed at their respective fixed positions, and varies a relative phase of an exposure duration for a light receiving unit to a light emitting duration of the illuminator, wherein the phase of the exposure duration for the light receiving unit to the light emitting duration of the illuminator can be changed at predetermined time intervals.

Also, in the image-pickup apparatus as described above, a method of changing the phase of the exposure duration for the light receiving unit to the light emitting duration of the illuminator at predetermined time intervals can be executed by controlling a change in the phase of an illumination light emission pulse or the exposure duration for the light receiving unit.

Furthermore, the image-pickup apparatus of the present invention can capture an image in a predetermined peak detection period, detect a peak image level in this period for each pixel, and process the captured image for display or to generate a control signal which can be outputted to the outside.

In addition, the image-pickup apparatus of the present invention can measure the distance between an object under measurement and the camera by changing the timings of the light emission of the illuminator and the exposure of the camera to measure a change in video output.

The image-pickup apparatus of the present invention can further measure the distance between the camera and an object under measurement by emitting light and receiving reflected light to generate a three-dimensional image of the object under measurement.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image-pickup apparatus for capturing an object, comprising: a light emitting unit for emitting irradiating light; a light receiving unit for receiving reflected light of the emitted irradiating light reflected from an object to capture an image of the object; a distance calculating unit for measuring a phase difference (time difference) from the emission of the light from said light emitting unit to the reception of reflected light by said light receiving unit for each unit composed of a predetermined number of adjacent pixels of the object to calculate a distance from said image-pickup apparatus to each corresponding pixel unit of the object; an image processing unit for corresponding the distance calculated in units of the predetermined number of pixels to the image captured by said light receiving unit; and a phase controller for relatively changing a phase difference (time difference) between a light emission operation of said light emitting unit and a light receiving operation of said light receiving unit at first predetermined time intervals, wherein said distance calculating unit measures the amount of light received by said light receiving unit in predetermined pixel units for a second predetermined time interval longer by a factor of a plural number than the first predetermined time interval, finds a phase difference which results in the largest amount of received light in the predetermined pixel units, and calculates a distance from said object to a corresponding pixel unit based on the phase difference which results in the largest amount of received light for each of the predetermined pixel units.

2. An image-pickup apparatus according to claim 1, wherein said second predetermined time interval is longer than the first predetermined time interval by a factor of three or more, and
    wherein said phase controller sequentially and relatively changes the phase difference between the light emitting operation and the light receiving operation in succession at the first predetermined time intervals in each of the second predetermined time intervals.

3. An image-pickup method for capturing an object by an image-pickup apparatus, comprising the steps of: a) emitting irradiating light; b) receiving reflected light of the emitted irradiating light from the object to capture an image of the object; c) measuring a phase difference (time difference) from the light emission to the light reception for each unit composed of a predetermined number of adjacent pixels of the object to calculate a distance from said image-pickup apparatus to a corresponding pixel unit of the object based on the measured phase difference; d) corresponding the distance calculated for each unit of the predetermined number of pixels to the captured image; and e) relatively changing the phase difference (time difference) between the light emitting operation and the light receiving operation at intervals of a first predetermined time, wherein said step c) includes measuring the amount of received light reflected from the object for each predetermined pixel unit for a second predetermined time interval longer by a factor of a plural number than the first predetermined time interval, finding a phase difference which results in the largest amount of received light for each of the predetermined pixel units, and calculating a distance from said object to a corresponding pixel unit based on the phase difference which results in the largest amount of received light for each of the predetermined pixel units.

4. An image-pickup method according to claim 3, wherein— said second predetermined time interval in said step e) is longer than the first predetermined time interval by a factor of three or more, and wherein said step e) includes sequentially and relatively changing the phase difference between the light emitting operation and the light receiving operation in succession at the first predetermined time intervals in each of the second predetermined time intervals.

* * * * *